Nov. 3, 1953     A. S. COPPAGE     2,657,923
AUTOMOBILE VENETIAN BLIND AND CONTROL MEANS THEREFOR
Filed Aug. 27, 1951
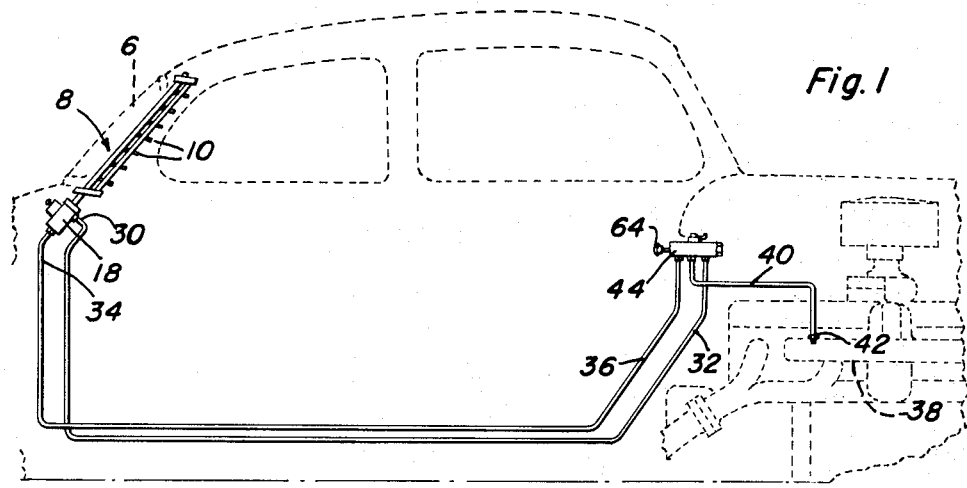
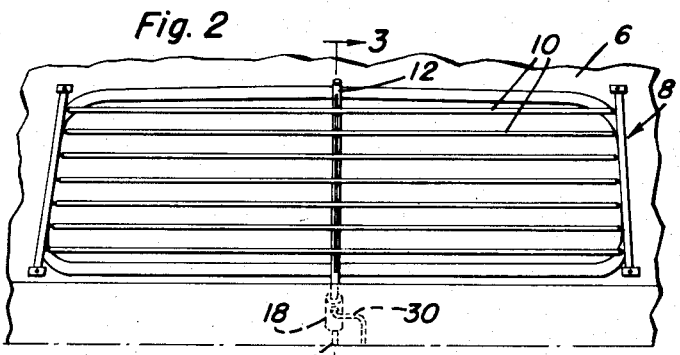
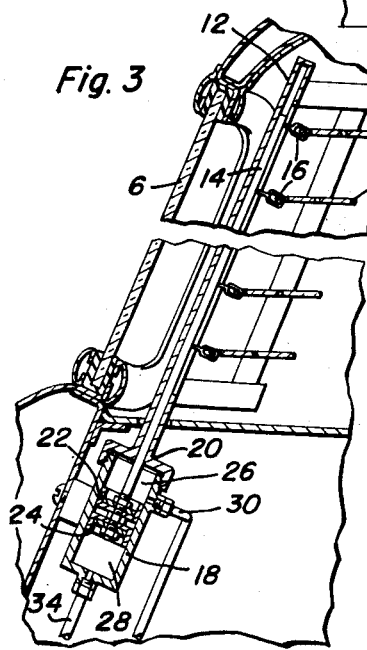
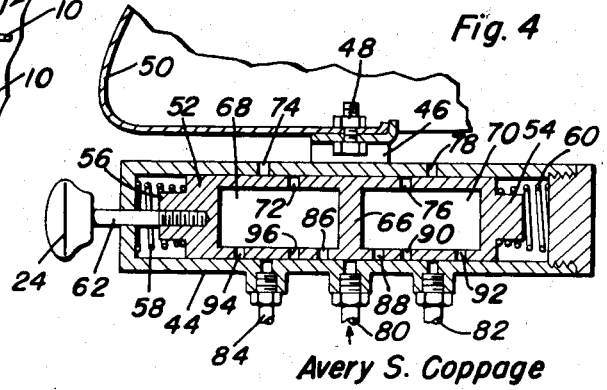
Avery S. Coppage
INVENTOR.

Patented Nov. 3, 1953

2,657,923

UNITED STATES PATENT OFFICE 2,657,923

AUTOMOBILE VENETIAN BLIND AND CONTROL MEANS THEREFOR

Avery S. Coppage, San Antonio, Tex., assignor of one-third to John R. Andre, Galveston, Tex.

Application August 27, 1951, Serial No. 243,831

3 Claims. (Cl. 268—96)

The present invention relates to a Venetian blind construction which is especially, though not necessarily, adapted to be used in conjunction with the rear window in an automobile or equivalent motor vehicle and has more particular reference to remote control means whereby the louvers or slats may be opened and closed at will according to the discretion and requirements of the driver of the automobile.

Stated somewhat more specifically, the invention appertains to novelly constructed and arranged control means which employs suction as a force, the suction being regulated by a highly practical "off" and "on" switch mounted on the instrument board in a manner to be hereinafter more explicitly revealed and described.

One object of the invention is to provide a Venetian blind which may be satisfactorily installed in coacting alignment with the automobile rear window, the same embodying a suitable frame structure, slats or louvers tiltably hinged on the frame structure, fixed guide means, a rod reciprocable in said guide means, operating connections between the rod and louvers, whereby raising and lowering the rod in the guide means serves to collectively open and close the louvers.

Further novelty is predicated upon the structural arrangement above recited in conjunction with a cylinder which may be mounted, for instance, in the trunk of the automobile and which has a piston reciprocable therein, the stated rod being mechanically connected with said piston, the piston dividing the cylinder into upper and lower chambers and selectively usable pipe lines being connected with said chambers to apply the force of suction in one chamber and to simultaneously release the pressure and suction in the other chamber.

A further and equally important object of the invention has to do with a push-pull switch construction which is adapted to be mounted within convenient reach of the driver on the instrument board, the same being characterized by a piston operating in a cylinder, a push-pull rod which is connected with the piston, springs interposed between the ends of the piston and coacting ends of the cylinder for maintaining the piston in a neutral position, there being a series of properly arranged and sequentially operable ports to alternately and timely apply the respective suction creating and complemental venting facilities.

Other objects and advantages will become more readily apparent from the following description and the accompanying sheet of illustrative drawings.

In the accompanying sheet of drawings, wherein like numerals are employed to designate like parts throughout the views:

Figure 1 is a view showing a phantom automobile and showing, somewhat diagrammatically, the improved Venetian blind and the remote control means and manner in which the latter is installed for practical usefulness;

Figure 2 is an enlarged elevation of the Venetian blind construction looking at the same in a direction from right to left in Figure 1;

Figure 3 is an enlarged fragmentary section taken on the vertical line 3—3 of Figure 2, looking in the direction of the arrows; and Figure 4 is a fragmentary sectional view, with portions in elevation, detailing the construction and mode of mounting the aforementioned remote controlled switch means.

Referring now to the drawings by way of reference numerals, attention is first directed to Figure 3 wherein the rear window of the automobile is denoted by the numeral 6. The frame structure of the Venetian blind is denoted generally by the numeral 8 and the louvers or slats 10 are suitably pivoted for tilting on the frame structure. The vertical aforementioned guide member is in the form of a fixed tube or sleeve which is longitudinally slotted and fixedly mounted is denoted by the numeral 12. There is a vertically reciprocable operating rod 14 and this is slidable up and down in the guide and has appropriate linked connection, or connections, at 16 with the respective slats making it possible to push the rod up and down in the guide and to thus open and close the slats in an obvious fashion. Mechanical means is provided for pushing the rod up and down and this takes the form of a cylinder 18 which, as shown in Figure 3, has a head 20 attached to one end thereof, the head carrying the aforementioned guide sleeve or tube 12 as well as the cylinder. Appropriate piston means is mounted in the cylinder and comprises coacting members 22 and 24 which, together, divide the cylinder into upper and lower chambers 26 and 28, respectively. An end portion 30 of one suction line 32 is connected with an upper half-portion of the cylinder and is communicable with the upper chamber 26. A similar end portion 34 of the other suction line or pipe 36 is axially connected with the lower end of the cylinder and is communicable with the chamber 28.

The source of suction is the automobile engine 38 which is shown in dotted lines, the suction producing pipe 40 being joined at 42 with said source of suction. Valve means is interposed between the respective lines 32, 36 and 40 in order to properly regulate the forces. The valve or so-called air switch shown in Figure 4 is the preferred structural adaptation for this purpose. It comprises a cylinder 44 which is secured by bracket means 46, as at 48, to the instrument board 50. There is a piston 52 slidable in the bore of the cylinder 44 and said piston has extensions 54 and 56 on opposite end portions which assist in maintaining in place the coil springs 58 and 60. These springs bear against the coacting ends of the cylinder and surround the extensions 54 and 56 and serve to normally center the piston in the cylinder and to hold it in what is to be designated as neutral position. The piston is manually adjusted by way of a push-pull rod 62 having a suitable knob 64 thereon. The piston is divided by a partition 66 into separate suction receiving and delivering chambers 68 and 70. The upper portion of the chamber 68 has a vent opening 72 therein which registers with a coacting vent 74 which leads to the atmosphere. There is a similar vent 76 for registration with the atmosphere vent 78 in the cylinder wall. The suction delivering and creating pipe 40 is joined to a central port in the cylinder as at 80 in Figure 4. Pipe 32 is joined to the right of the pipe 80 and, by way of a port, with the cylinder, as at 82. The other and remaining pipe 36 is connected with the cylinder, as at 84, to the left of the pipe 80. The piston has ports 86 and 88 which selectively register with the pipe 80. Then, there are ports 90 and 92 which register selectively with the suction line 82. Finally, there are similar ports on the left at 94 and 96 which register selectively with the line 84.

Assuming that the push rod 62 is pushed from left to right in Figure 4, the spring 60 is compressed and the port 86 registers with the suction line 80 and permits suction to be active in the chamber 68 of the piston. At the same time the port 94 registers with 84 and thus, the line 66 is brought into play. By way of the connection 30 with the cylinder 18, the chamber 26 is acted on and also the piston 22 is acted on and lifted up forcing the rod 14 up in the guide 12 and lowering the slats or louvers in the Venetian blind. At the same time, the suction in the chamber 28 is relieved by way of the line 32 and the fact that said line is now in open communication with the atmosphere by way of the vent 78. The reverse of this procedure of operation is true when the rod 62 is pulled toward the driver, that is, in a direction from right to left. In other words, the suction is then created by way of the line 80 in the chamber 70 and by way of the pipe 32 and the connection 34 to act on the piston means 22 and 24 in an opposite direction, pulling the rod 14 down and tilting the slats or louvers in an opposite direction.

It is thought that persons skilled in the art to which the invention relates will be able to obtain a clear understanding of the invention after considering the description in connection with the drawings. Therefore, a more lengthy description is regarded as unnecessary.

Minor changes in shape, size and arrangement of details coming within the field of invention claimed may be resorted to in actual practice, if desired.

Having described the invention, what is claimed as new is:

1. In a structure of the class described, in combination, stationary frame means, a plurality of complemental louvers tiltably pivoted in horizontal positions on said frame means and providing an openable and closeable Venetian blind, a cylinder fixed on a plane below said frame means, an upstanding guide tube fixed to the upper end of said cylinder and solely supported by said cylinder and having its axis in axial alignment with the axis of said cylinder, said tube being slotted lengthwise, a rod slidably mounted in said tube, flexible operating connections between said rod and their respective louvers, a piston reciprocable in said cylinder and dividing the cylinder into upper and lower chambers, a first pipe line communicatively joined with the upper chamber and for delivering air under pressure into said upper chamber and forcing the piston down and consequently sliding the rod downwardly in said tube and tilting the louvers to closed or partly closed positions, a second pipe line communicably joined with the lower chamber to drive the piston and rod upwardly relative to the cylinder and tube and to tilt the louvers to either fully or partly open position, a source of suction including a third pipe line and a remote hand controlled valve, said valve comprising a piston and the cylinder reciprocable in the piston, spring means interposed between the respective ends of the piston and corresponding ends of the cylinder for normally centering the piston and maintaining it in a neutral position, and a plurality of coacting ports between the cylinder and the piston, said first, second and third, pipe lines being communicatively joined with predetermined ports.

2. In the structure of the class described, in combination, a pair of vertically disposed end frames, a plurality of horizontally disposed cooperating louvers pivotally mounted at their respective ends between said end frames, a vertical cylinder fixedly supported on a plane below said frames and louvers, said cylinder being screw-threaded at its upper end, a head screwed on said upper end, an upstanding tube attached to and rising from said head and occupying a position midway between said end frames, said tube being slotted lengthwise, a piston reciprocable in and dividing said cylinder into upper and lower chambers, a remote controlled hand valve comprising a cylinder, a piston reciprocable in said cylinder, said piston and cylinder having cooperating selectively registrable ports, said piston being provided with hand operating means, coil springs interposed between the respective ends of the piston and cooperating ends of the cylinder, a suction pipe line adapted to communicate with a source of suction and communicatively connected at its opposite end with cooperating ports in said cylinder, and additional pipe lines connected with selected ports in said last-named cylinder and having their opposite ends connected communicatively with the first-named cylinder and communicating and registering with the respective upper and lower chambers in the first-named cylinder.

3. In the structure of the class described, in combination, a pair of vertically disposed spaced end frames arranged in approximate opposed parallelism, a plurality of horizontally disposed cooperating louvers pivotally mounted between said end frames, a vertical cylinder fixedly supported on a plane below said end frames and louvers, said cylinder having its upper end screw-threaded, a head having screw threads screwed on the upper end, said head being centrally apertured, a tube attached at its lower end to the apertured portion of the head and rising from the head and occupying a vertical position midway between the end frames, said tube being slotted lengthwise, a piston reciprocable in said cylinder and dividing the latter into upper and lower chambers, said piston having a rod extending through the upper chamber and through the tube, means affording an operating connection between the rod and slotted portion of the tube and adjacent trailing edges of the louvers for opening and closing the louvers either wholly or partly as the piston and rod reciprocate up and down in said tube, a first pipe communicatively joined to the cylinder and cooperating with the upper chamber, and a second pipe joined axially to the lower end of the cylinder and communicating with the lower chamber in the cylinder.

AVERY S. COPPAGE.

References Cited in the file of this patent

UNITED STATES PATENTS

| Number | Name | Date |
| --- | --- | --- |
| 1,014,679 | Von Wagner | Jan. 16, 1912 |
| 1,018,585 | Reitz | Feb. 27, 1912 |
| 2,199,562 | Griffin | May 7, 1940 |
| 2,304,245 | Dorries | Dec. 8, 1942 |
| 2,348,838 | Oishei | May 16, 1944 |
| 2,364,181 | Ackerman et al. | Dec. 5, 1944 |
| 2,371,154 | Cuthill et al. | Mar. 13, 1945 |
| 2,373,085 | Ackerman et al. | Apr. 10, 1945 |
| 2,383,912 | Garguilo | Aug. 28, 1945 |
| 2,565,979 | Michaelsen | Aug. 28, 1951 |
| 2,574,729 | Coffman | Nov. 13, 1951 |
| 2,581,465 | Arnold | Jan. 8, 1952 |